Figure 1:
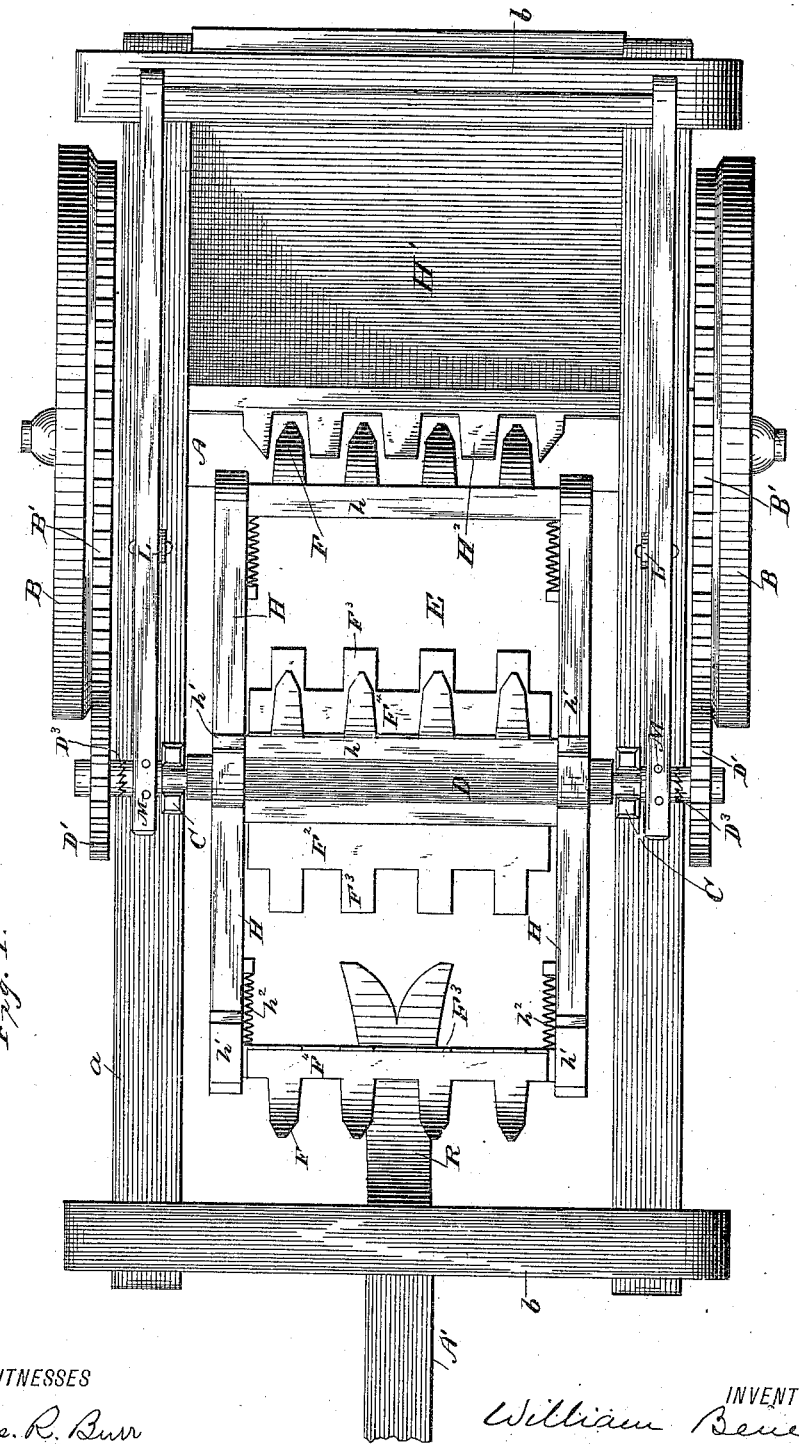

(No Model.)

W. BENEDICT.
POTATO DIGGER.

No. 311,635. Patented Feb. 3, 1885.

WITNESSES
Chas. R. Burr
Fred P. Church

INVENTOR
William Benedict
by Church & Church
his Attorneys

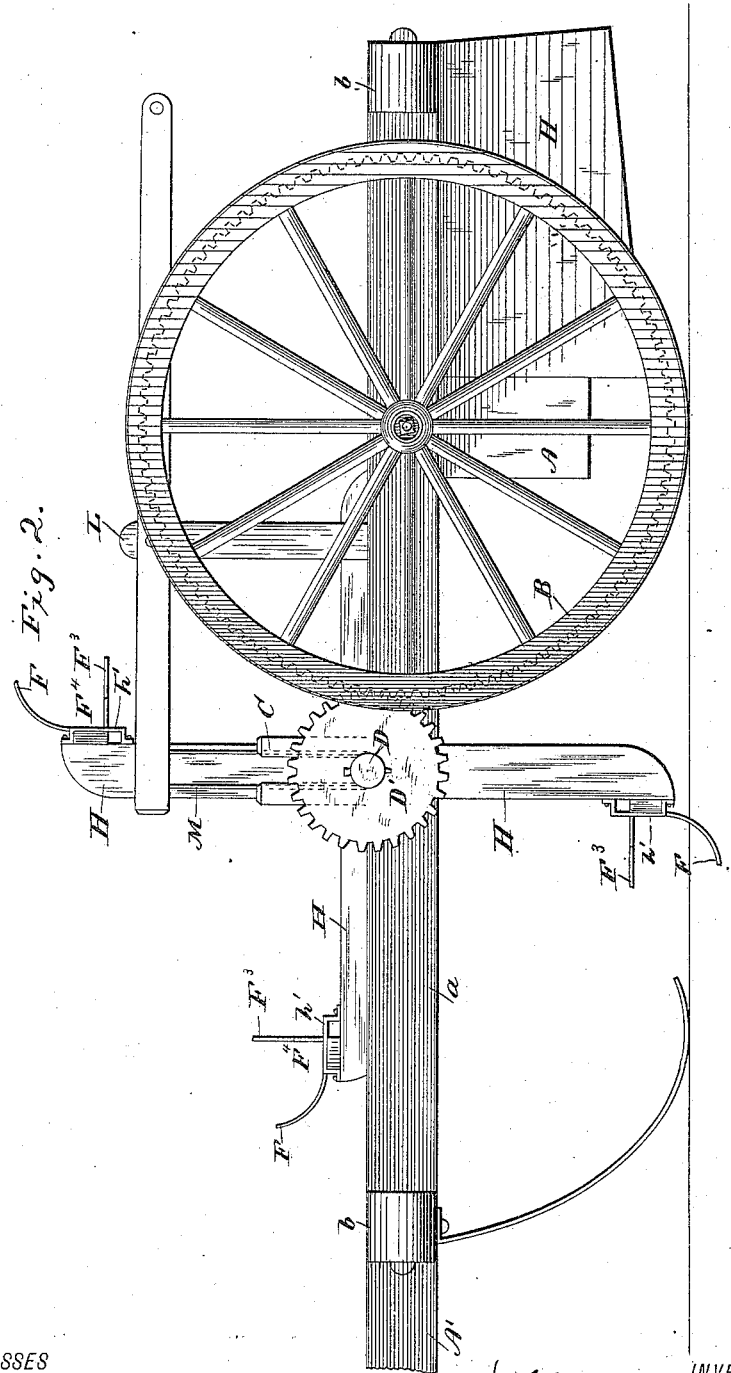

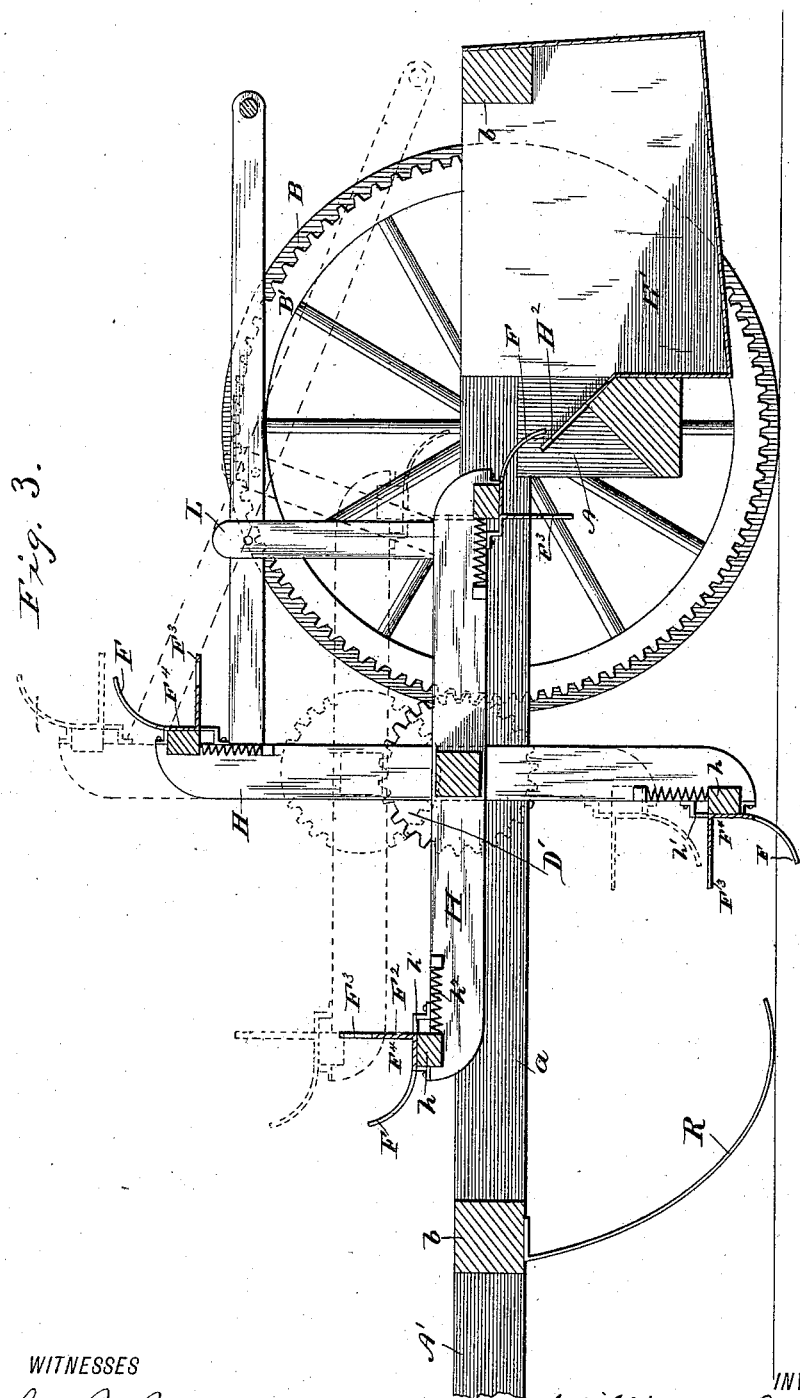

UNITED STATES PATENT OFFICE.

WILLIAM BENEDICT, OF TUNKHANNOCK, PENNSYLVANIA.

POTATO-DIGGER.

SPECIFICATION forming part of Letters Patent No. 311,635, dated February 3, 1885.

Application filed March 1, 1884. (No model.)

*To all whom it may concern:*

Be it known that I, WILLIAM BENEDICT, of Tunkhannock, in the county of Wyoming and State of Pennsylvania, have invented certain new and useful Improvements in Potato-Diggers; and I do hereby declare the following to be a full, clear, and exact description of the same, reference being had to the accompanying drawings, forming a part of this specification, and to the figures and letters of reference marked thereon.

My present invention relates to that class of agricultural machines intended and designed more particularly for digging potatoes and like vegetables and roots.

The general characteristics of my improved machine are a series of diggers or spades, carried by a revolving frame supported in movable bearings upon the main frame, which latter is sustained upon two ground-wheels, and a runner provided with lateral cutting-edges. The revolving frame carries, in addition to the spades, a corresponding series of pockets into which the potatoes are received and transported to a receptacle in the rear of the machine.

The invention will first be described, and then specifically pointed out in the claims appended hereto.

In the accompanying drawings, Figure 1 is a plan view, Fig. 2 a side elevation, and Fig. 3 a longitudinal section, of my improved digger.

The main frame is composed of the side pieces, a a, and end pieces, b b. This frame is supported upon and fastened to the bent axle A, to which the ground-wheels B B are applied, and is provided with slotted posts C C, rising from the side pieces, a a, and forming bearings for the shaft D, to which the rotary frame E, carrying the spades F, is attached.

It will be seen that by employing the bent axle I am enabled to use a much shorter frame than would otherwise be required.

To the forward end piece b is fastened in any suitable manner the tongue A', and beneath the said cross-piece, at or about the middle thereof, is attached the runner R. This runner is constructed of sheet-steel, and curves downward and backward from the point of attachment, and increases in width toward the rear end, which latter may be bifurcated, as shown, if desired. The runner serves the double purpose of supporting the forward end of the machine, while its edges act as cutters to sever the weeds and potato-tops at or slightly below the surface of the ground and in advance of the diggers. It also assists, when working on hilly or irregular surfaces, to maintain the proper position of the spades.

To the inner sides of the ground-wheels B B are fastened gear-wheels B' B', which mesh with pinions D' D' on the ends of the shaft D. A number of radial arms, H, are fastened to the shaft D, and upon these arms are mounted the cross-bars h, the ends whereof are fitted to slide in boxes h', being pressed outward by the springs h².

On each cross-bar h is fastened a series of spades or digging-teeth, F, made separate from or integral with the plate F², as preferred. Said plate is bent outward, as shown, and terminates in a series of fingers, F³, which, in connection with plate F² and the spades, form pockets F⁴.

As thus constructed and arranged the spades are permitted to yield in case any obstruction is encountered, thus reducing the liability of breakage, and at the same time facilitating the working of the machine in wet or heavy soil.

The shaft D and attached mechanism is free to slide vertically in the slotted posts C C, being held down in working position by its own weight, which may, if found necessary, be augmented or supplemented by additional weights.

By thus mounting the working parts of the machine two important advantages are gained. In the first place the entire rotary frame is free to rise should an obstruction be encountered that could not otherwise be passed by the spades, and in the second place it permits the frame to be raised for transportation from place to place. To effect this last-mentioned operation, a lever, L, is mounted upon pivots secured to posts L' L', and is provided with yokes or stirrups M M, which embrace the shaft D at or near the journals thereof. The lever L projects toward the rear of the machine, and by depressing its free end the shaft D is elevated and the pinions thereon raised out of gear with the drive-wheels.

The pinions D' D' are put in operative connection with the shaft D by the backing-ratchets D³, of the usual construction; or the ratchets may be interposed between the ground-wheels B B and their gears B' B'.

Attached to the rear portion of the main frame is a box or receptacle, H', into which the potatoes are delivered from the pockets F⁴ after having been removed from the ground by the spades.

A series of clearing-fingers, H², located near the front edge of the box H and in the path of the rotating spades, serves to remove any obstructing material that may lodge or cling to the spades.

Having thus described my invention, what I claim as new, and desire to secure by Letters Patent, is—

1. In a potato-digger, and in combination with the digging apparatus thereof, the runner provided with the lateral cutting-edges, substantially as described.

2. In a potato-digger, and in combination with the main frame thereof, mounted upon driving-wheels, a curved runner provided with lateral cutting-edges and attached to the forward portion of the machine, substantially as described.

3. In a potato-digger, and in combination with the main frame, carrying the operative mechanism, the curved runner having lateral tapering cutting-edges, as and for the purpose set forth.

4. In a potato-digger, and in combination with the main frame thereof, the revolving frame, mounted upon a shaft geared to the driving-wheels and provided with a series of radial arms having bearings or boxes therein, a series of cross-bars, each fitted to slide in said bearings, springs for supporting said cross-bars, and a series of spades attached to said cross-bars, as and for the purpose specified.

5. The combination, with the main frame of a potato-digger, of a series of yielding cross-bars, $h'$, mounted in radial arms H, attached to shaft D, slotted posts C C, and driving mechanism, such as indicated, intermediate the main driving-wheels and shaft D, substantially as described.

6. In combination with the radial arms H, mounted upon the shaft D, and provided with boxes $h'$, the series of cross-bars $h$, each carrying a plate, F², bent to form spades F, and fingers F³, substantially as described.

Witnesses:     WM. BENEDICT.
H. F. METCALF,
GEO. E. OSTERHOUT.